(12) United States Patent
Ogura et al.

(10) Patent No.: US 6,688,175 B2
(45) Date of Patent: Feb. 10, 2004

(54) SPEEDOMETER MOUNTING STRUCTURE IN MOTORCYCLE

(75) Inventors: Hideo Ogura, Saitama (JP); Seiji Yamaguchi, Saitama (JP); Masamoto Ito, Saitama (JP); Toshihiko Suda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 32 days.

(21) Appl. No.: 09/962,093

(22) Filed: Sep. 26, 2001

(65) Prior Publication Data

US 2002/0041077 A1 Apr. 11, 2002

(30) Foreign Application Priority Data

Sep. 26, 2000 (JP) ........................................ 2000-292307

(51) Int. Cl.$^7$ ................................................. B62D 1/18
(52) U.S. Cl. ...................................... 73/493; 280/288.4
(58) Field of Search ................................ 280/279, 280, 280/288.4; 180/219; 73/493

(56) References Cited

U.S. PATENT DOCUMENTS

| | | | | | |
|---|---|---|---|---|---|
| 3,938,395 | A | * | 2/1976 | Henecke | 74/12 |
| 4,032,168 | A | * | 6/1977 | Emerson | 280/279 |
| 4,687,072 | A | * | 8/1987 | Komuro | 180/219 |
| 5,855,388 | A | * | 1/1999 | Brewer | 280/288.4 |
| 6,060,985 | A | * | 5/2000 | Siviero | 340/461 |
| 6,158,279 | A | * | 12/2000 | Saiki | 73/493 |
| 6,176,503 | B1 | * | 1/2001 | George | 280/274 |
| 6,407,663 | B1 | * | 6/2002 | Huggett | 340/461 |

FOREIGN PATENT DOCUMENTS

JP          11-208557         8/1999

* cited by examiner

Primary Examiner—Lesley D. Morris
Assistant Examiner—Paul Royal, Jr.
(74) Attorney, Agent, or Firm—Birch, Stewart, Kolasch & Birch, LLP

(57) ABSTRACT

A speedometer mounting structure in a motorcycle is provided which is capable of mounting the speedometer without deteriorating the design of the motorcycle. A handlebar holder is provided to secure a steering handlebar, on a fork support member for supporting a front fork of a motorcycle. The speedometer is mounted on the handlebar holder.

14 Claims, 3 Drawing Sheets

SPEEDOMETER MOUNTING STRUCTURE IN MOTORCYCLE

This nonprovisional application claims priority under 35 U.S.C. § 119(a) on Patent Application No. 2000-292307 filed in Japan on Sep. 26, 2000, which is herein incorporated by reference.

BACKGROUND OF THE INVENTION

1. Field of the Invention

The present invention relates to a speedometer mounting structure for a motorcycle.

2. Description of the Background Art

A speedometer mounting structure for a motorcycle is disclosed in Japanese Patent Laid-Open No. Hei 11-208557. This background art, as schematically shown in FIG. 4, includes a mounting member 3, such as a bracket, which is attached at the front of a fork support member 2 which rotatably connects a front fork 1 to an unillustrated vehicle body frame. A speedometer 4 is fixedly attached on the mounting member 3.

The background art, however, has the following problems to be solved. Generally, a headlight is mounted at the front of the front fork 1. The headlight has a great effect on the design of motorcycles. In the aforesaid mounting structure, however, the speedometer 4 projecting to the front of the front fork 1 is located about above the headlight, which, therefore, is likely to deteriorate the design effect of the speedometer 4.

For mounting the speedometer 4, therefore, a separate mounting member 3 is needed, presenting such a problem as an increased component count, and accordingly, an increased number of installation processes.

SUMMARY OF THE INVENTION

In view of the above-described problems inherent in the background art, it is an object of the present invention to provide a speedometer mounting structure for a motorcycle which is capable of mounting a speedometer without deteriorating the design of the motorcycle.

According to the speedometer mounting structure of the present invention, a motorcycle is equipped with a vehicle body frame, a front fork is arranged at the front of the vehicle body frame, a fork support member is located at the upper end of the front fork and rotatably connecting the front fork to the vehicle body frame, and a steering handlebar is mounted on the fork support member. In the motorcycle, the speedometer which reads vehicle speeds is mounted above the vicinity of the front fork. The handlebar holder for securing the steering handlebar is mounted on the fork support member, and the speedometer is mounted on this handlebar holder.

According to the speedometer mounting structure for a motorcycle of the present invention, the handlebar holder is comprised of a lower holder secured on the fork support member, and an upper holder fixedly attached on the lower holder, for securely holding the steering handle bar in between the lower holder and the upper holder. The speedometer is mounted on the upper holder.

According to the speedometer mounting structure for a motorcycle of the present invention, a housing box including an opening which is directed upward is formed in the upper holder, and the speedometer is mounted in this housing box.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
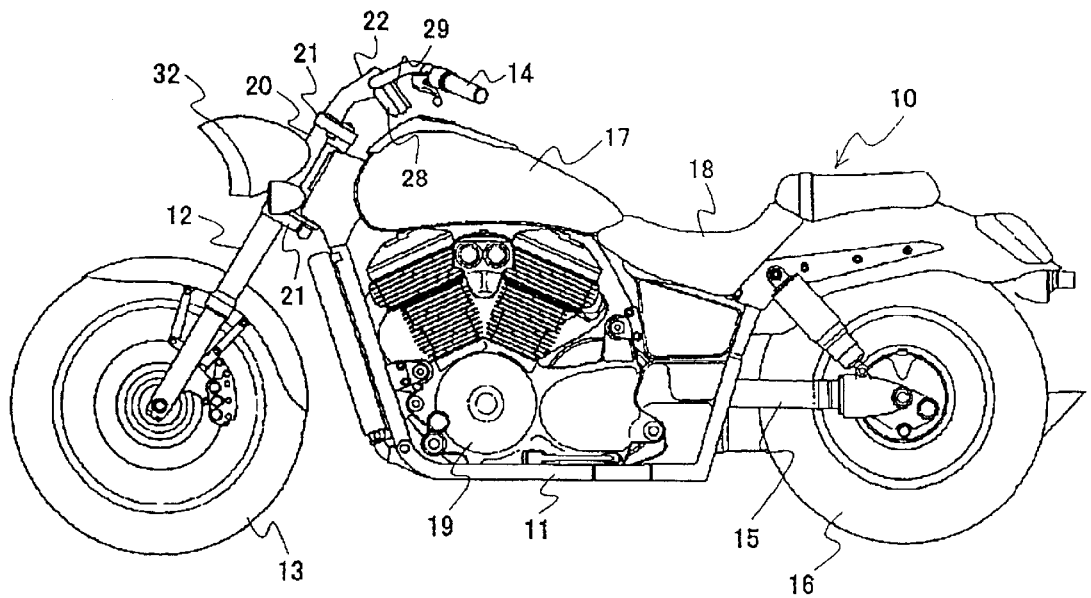
FIG. 1 is a side view of a motorcycle to which one embodiment of the present invention is applied.

One embodiment of the speedometer mounting structure according to the present embodiment will be described with reference to the accompanying drawings. In FIG. 1, reference numeral 10 refers to a motorcycle to which the present embodiment is applied. The motorcycle 10 includes a vehicle body frame 11, a front fork 12 arranged at the front of the vehicle body frame 11, and a front wheel 13 rotatably mounted at the lower end of the front fork 12. A steering handlebar 14 is mounted at the upper end of the front fork 12. A rear fork 15 is pivotably mounted at the lower rear part of the vehicle body frame 11, and a rear wheel 16 is rotatably mounted on the rocking end of the rear fork 15. A fuel tank 17 is mounted at the rear position of the steering handlebar 14, in the upper part of the vehicle body frame 11. A seat 18 is mounted to the rear of the fuel tank 17, and an engine 19 is mounted below the fuel tank 17.

The front fork 12 is vertically arranged under the head pipe 20 constituting the front part of the vehicle body frame 11, and is connected to a pair of bridges 21, upper and lower, which are rotatably connected to the head pipe 20. In the present embodiment, the pair of bridges 21 serve as a fork support member for rotatably connecting the front fork 12 to the vehicle body frame 11. On the bridges 21 located in the upper part of the vehicle body frame, a handlebar holder 22 is integrally mounted for securing the steering handlebar 13.

Figure 2:
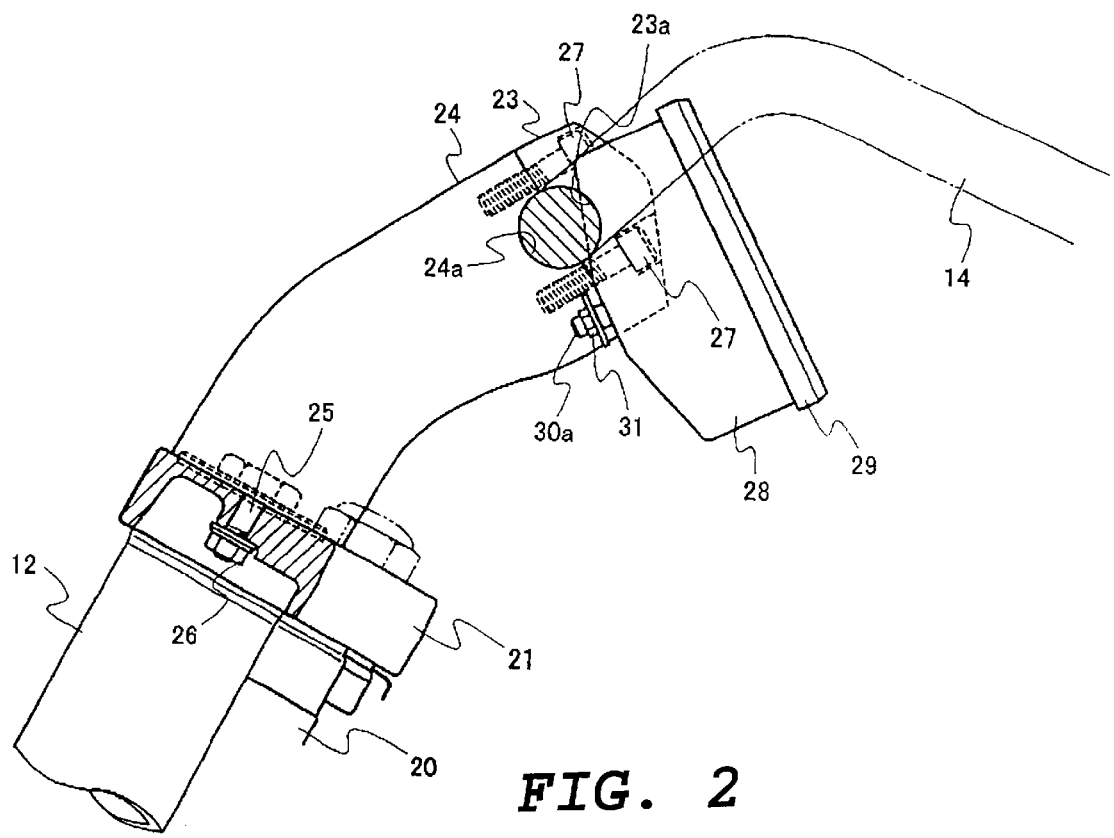
FIG. 2 is an enlarged side view of a major portion, partly broken, showing one embodiment of the present invention.
Figure 3:
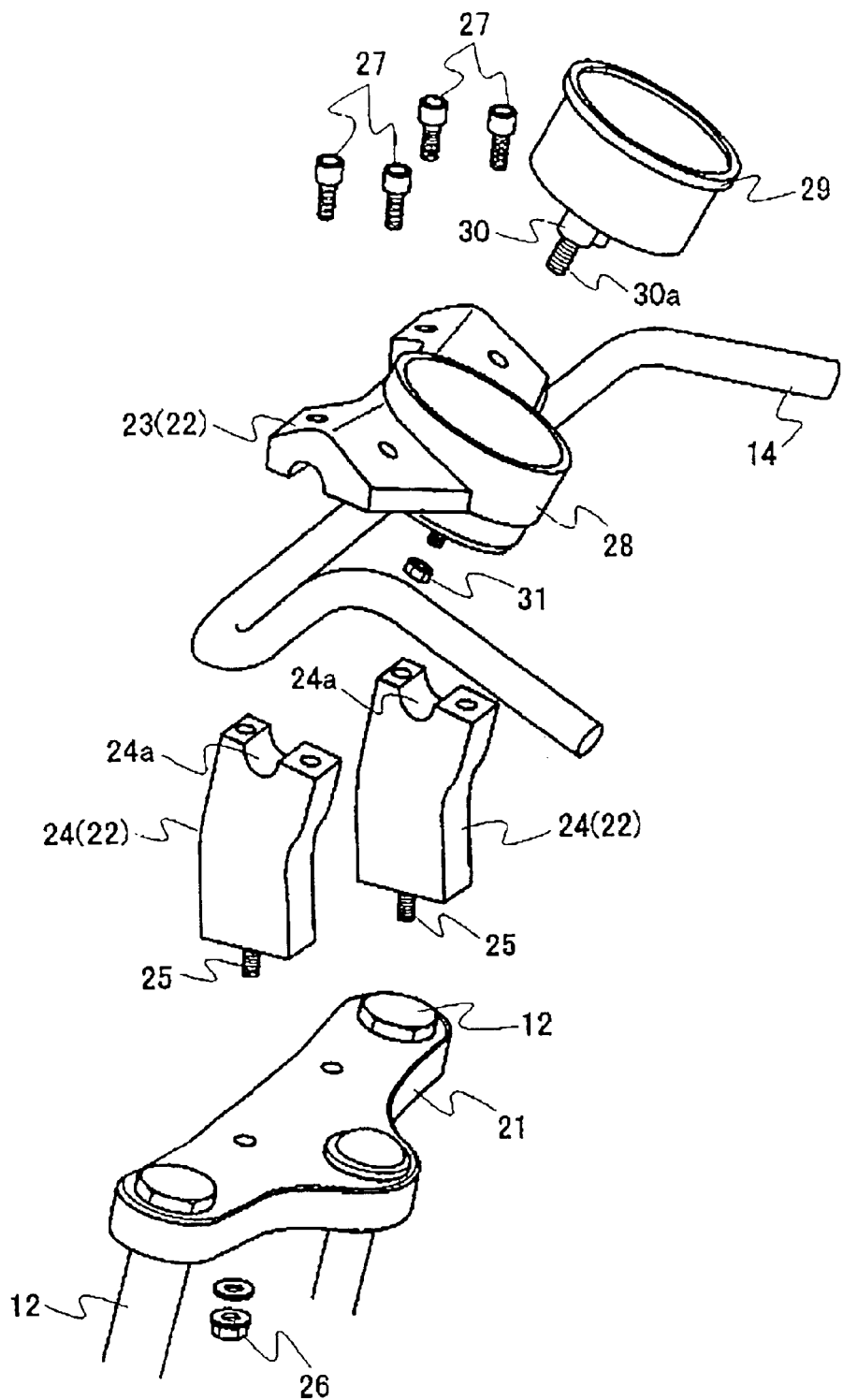
FIG. 3 is an exploded perspective view of a major portion, showing one embodiment of the present invention.
Figure 4:
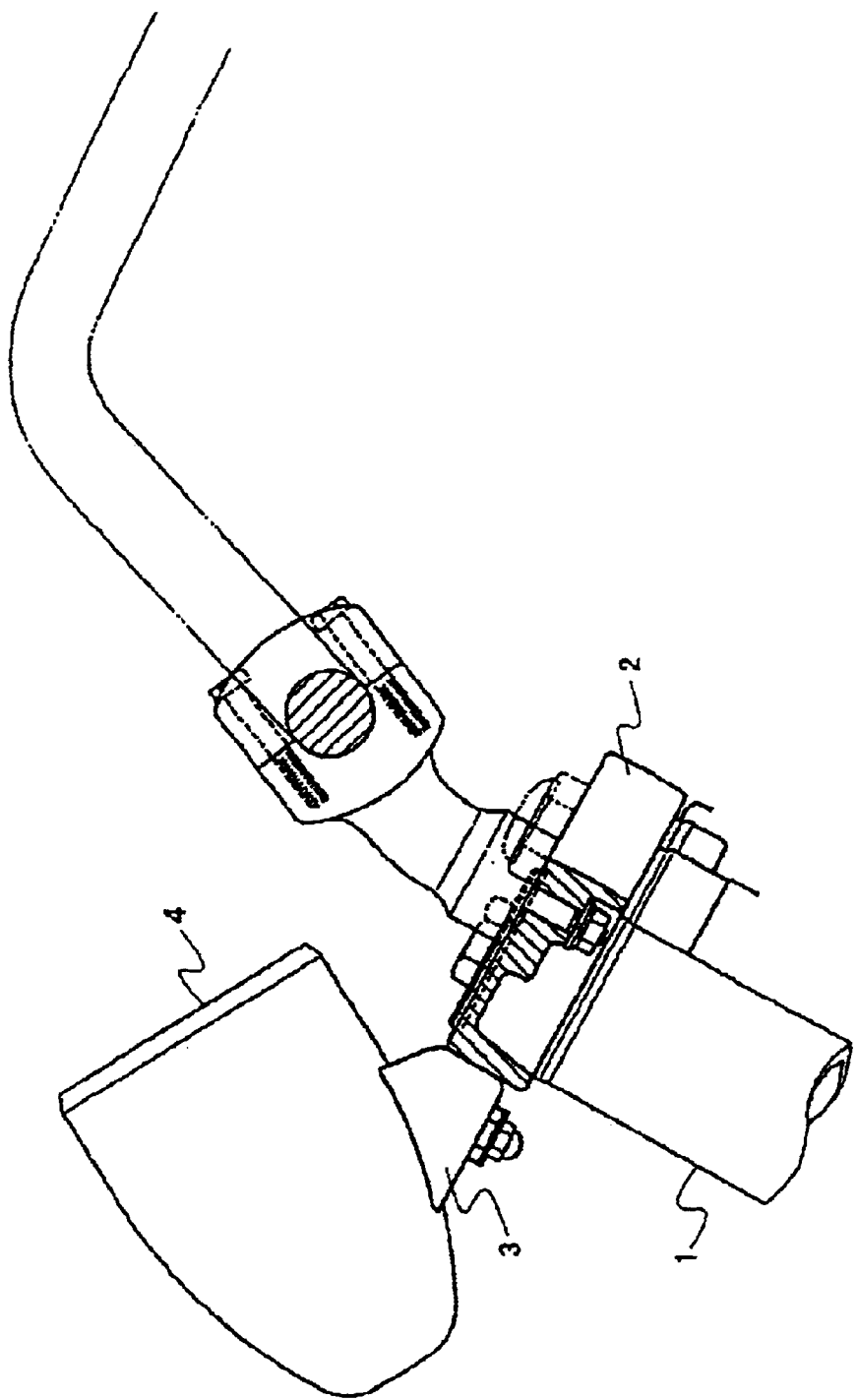
FIG. 4 is an enlarged side view of a major portion, partly broken, showing a conventional example.

In the present embodiment, the handlebar holder 22, as shown in FIGS. 2 and 3, is split into two upper and lower parts: an upper holder 23 and a lower holder 24, which, as shown in FIG. 3, are attached on the bridges 21 in two places apart in the width direction of the vehicle body. Each lower holder 24 is provided, in the lower part, with a pair of connecting bolts 25, which are unitarily projectingly formed therewith. Each connecting bolt 25 is inserted from above into the bridge 21, and is fitted with a nut 26 from below the bridge 21, thereby securing each lower holder 24 to the bridge 21.

The upper holder 23, as shown in FIG. 3, is mounted across the upper ends of the lower holders 24. Bolts 27 inserted vertically into the upper holder 23 are screwed into the lower holders 24, thereby fixedly attaching the upper holder 23 to the lower holders 24.

Recesses 23a and 24a are formed in the contact surfaces of the upper holder 23 and the lower holders 24. The recesses 23a and 24a have an approximately semi-circular inner surface. The steering handlebar 14 is set in a space formed by the recesses 23a and 24a, and is fixedly held in between the upper holder 23 and the lower holders 24. A housing box 28 is formed in about the middle of the upper holder 23 which opens upwardly. A speedometer 29 is mounted in the housing box 28.

The speedometer 29 has a cylindrical projection 30 integrally formed with the bottom thereof which serves as a cable guide, and a screw portion 30a is formed in the forward end portion thereof. The projection 30 goes through the bottom of the housing box 28, projecting downwardly, when the speedometer 29 is installed in the housing box 28. A nut 31 is threaded onto the screw portion 30a formed at the forward end thereof, and is pressed against the underside of the housing box 28 to thereby fix the speedometer 29 in the housing box 28.

In the present embodiment of the speedometer mounting structure thus configured, the speedometer 29 is inserted into the housing box 28 of the upper holder 23, the screw portion 30a is protruded out of the bottom of the housing box 28, and the nut 31 is screwed onto the screw portion 30a, to thereby temporarily assemble the speedometer 29 in the upper holder 23.

Therefore, after mounting the steering handlebar 14 between both lower holders 24 attached on the bridge 21, the upper holder 23 is set to cover the steering handlebar 14, and the upper holder 23 is secured by the bolts 27 to the lower holders 24. The steering handlebar 14 is thus fixedly installed by the above-described operation procedure, and the speedometer 29 is mounted above about the intermediate part of the steering handlebar 14. The speedometer 29, therefore, is mounted largely apart from the headlight 32 mounted ahead of the front fork 12 as shown in FIG. 1, thereby gaining a design effect by the headlight 32.

The speedometer 29, being mounted in the space surrounded by the steering handlebar 14 to the rear of the front fork 12, becomes smooth in the outside line as viewed from the side of the motorcycle 10. In this respect also, the design effect is enhanced. Furthermore, the housing box 28 is formed in the handlebar holder 22, to thereby mount the speedometer 29 in the housing box 28. The handlebar holder 22 is herein also used as a mounting member, so that the number of components required for mounting the speedometer 29 can be decreased and accordingly an installing operation can be simplified.

It is to be noted that the shape and dimensions of component members shown in the present embodiments are described as examples, and various modifications based on design requirements are possible.

According to the speedometer mounting structure in a motorcycle of the present invention, as heretofore explained, the speedometer is mounted on the handlebar holder, in a position largely apart from the headlight mounted ahead of the front fork, thereby enabling a gain in the design effect of the speedometer mounting structure in relation to the headlight.

Since the speedometer can be mounted to the rear of the front fork, and in the space surrounded by the steering handlebar, the outline of the speedometer mounting structure becomes smooth, which enhances the design effect from this point of view.

Furthermore, the housing box is formed in the handlebar holder, to thereby mount the speedometer in the housing box. The handlebar holder is used as a mounting member, so that the number of components required for mounting the speedometer can be decreased and accordingly an installing operation can be simplified.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A speedometer mounting structure in a motorcycle equipped with a vehicle body frame, a front fork provided at the front of the vehicle body frame, a fork support member rotatably connecting the front fork to the vehicle body frame, and a steering handlebar mounted on the fork support member, the speedometer mounting structure in a motorcycle for mounting, in the vicinity of the upper part of the front fork, a speedometer which reads vehicle speeds, said speedometer mounting structure including a handlebar holder attached on the fork support member to secure the steering handlebar, and a speedometer mounted on said handlebar holder, wherein said handlebar holder includes a lower holder to be secured on the fork support member, and an upper holder secured on said lower holder, for holding and securing the steering handlebar between said upper holder and said lower holder, and wherein the speedometer is mounted on the upper holder.

2. The speedometer mounting structure in a motorcycle as claimed in claim 1, wherein a housing box is formed in said upper holder, the housing box having an opening which is directed upward, and said speedometer is mounted in said housing box.

3. A speedometer mounting structure for a motorcycle, comprising:
    a handlebar holder for securing a steering handlebar to a fork support member, said handlebar holder including a speedometer mount for mounting a speedometer thereto; and
    a speedometer mounted on said handlebar holder,
    wherein said handlebar holder includes a lower holder securable to the fork support member, and an upper holder secured on said lower holder, for holding and securing the steering handlebar between said upper holder and said lower holder, and
    wherein said upper holder includes a housing box formed therein, the housing box having an opening which is directed upward, said speedometer being mounted in said housing box.

4. The speedometer mounting structure for a motorcycle as claimed in claim 3, wherein said lower holder comprises a pair of spaced-apart lower holder members.

5. The speedometer mounting structure for a motorcycle as claimed in claim 4, wherein each of said lower holder members includes an upwardly-facing part-circular recess in an upper end thereof.

6. The speedometer mounting structure for a motorcycle as claimed in claim 5, wherein said upper holder includes a pair of downwardly-facing part-circular recesses in alignment with each upwardly-facing part-circular recess in said lower holder members.

7. The speedometer mounting structure for a motorcycle as claimed in claim 6, wherein the steering handlebar is securable between said downwardly-facing part-circular recesses in said upper holder and said upwardly-facing part-circular recesses in said lower holder members.

8. The speedometer mounting structure for a motorcycle as claimed in claim 4, wherein each of said lower holder members includes a downwardly-extending fastener formed integrally in a lower end thereof.

9. A motorcycle comprising:

a vehicle body frame;

a front fork provided at the front of said vehicle body frame;

a fork support member rotatably connecting said front fork to said vehicle body frame;

a steering handlebar mounted on said fork support member;

a handlebar holder attached to said fork support member for securing said steering handlebar to said fork support member;

said handlebar holder including a speedometer mounting structure for mounting a speedometer in the vicinity of an upper part of said front fork; and a speedometer mounted on said handlebar holder, wherein said handlebar holder includes a lower holder secured to said fork support member, and an upper holder secured on said lower holder, for holding and securing said steering handlebar between said upper holder and said lower holder, and wherein said upper holder includes a housing box formed therein, the housing box having an opening which is directed upward, said speedometer being mounted in said housing box.

10. The motorcycle as claimed in claim 9, wherein said lower holder comprises a pair of spaced-apart lower holder members.

11. The motorcycle as claimed in claim 10, wherein each of said lower holder members includes an upwardly-facing part-circular recess in an upper end thereof.

12. The motorcycle as claimed in claim 11, wherein said upper holder includes a pair of downwardly-facing part-circular recesses in alignment with each upwardly-facing part-circular recess in said lower holder members.

13. The motorcycle as claimed in claim 12, wherein said steering handlebar is secured between said downwardly-facing part-circular recesses in said upper holder and said upwardly-facing part-circular recesses in said lower holder members.

14. The motorcycle as claimed in claim 13, wherein each of said lower holder members includes a downwardly-extending fastener formed integrally in a lower end thereof.

* * * * *